United States Patent [19]
Beck et al.

[11] 3,840,928
[45] Oct. 15, 1974

[54] TOOL HOLDER FOR LATHES

[75] Inventors: Gerhard Beck; Richard Beck, both of Dettingen/Erms; Alfred Muller, Esslingen-St. Bernhard; Hermann Muller, Dettingen/Erms; Eberhard Gluck, Riederich, all of Germany

[73] Assignee: Lechler Apparatebau KG, Stuttgart, Germany

[22] Filed: June 1, 1973

[21] Appl. No.: 366,061

[30] Foreign Application Priority Data
June 3, 1972 Germany............................. 2227194

[52] U.S. Cl.................... 10/89 H, 10/141 H, 82/34, 82/36 R
[51] Int. Cl....... B29k 1/56, B23b 29/00, B23q 1/00
[58] Field of Search...................... 82/35, 36, 37, 34; 10/89 H, 89 R, 129 R, 141 H

[56] References Cited
UNITED STATES PATENTS

| | | | |
|---|---|---|---|
| 2,389,998 | 11/1945 | Rosenthal....................... | 10/89 H X |
| 2,541,262 | 2/1951 | Mather et al. ...................... | 10/89 H |
| 3,579,688 | 5/1971 | Keltz et al......................... | 10/141 H |
| 3,599,260 | 8/1971 | Lesh .................................. | 10/89 H |
| 3,717,892 | 2/1973 | Johnson............................ | 10/141 H |

*Primary Examiner*—Harrison L. Hinson
*Attorney, Agent, or Firm*—Ernest F. Marmorek

[57] ABSTRACT

A support for a thread cutting tool on a lathe having an axle for removably receiving the tool support in a fixed member of the lathe opposite to the chuck of the lathe, a connecting member carrying the tapping tools and rotably mounted with respect to the axle, and a gripping sleeve rotably mounted with respect to the connecting member, the axle, the connecting member and the gripping sleeve being in mechanical coupling.

9 Claims, 2 Drawing Figures

TOOL HOLDER FOR LATHES

FIELD OF THE INVENTION

The present invention relates an arrangement for supporting a thread cutting tool on a lathe.

BACKGROUND OF THE INVENTION

The conventional supporting arrangements for thread cutting tools for lathes are constructed in such a manner that the end of the thread cutting operation is controlled by an end switch or by a stop boss. Furthermore, in conventional apparatus the interruptions and renewed starting of the cutting process can be performed only by the use of couplings.

SUMMARY OF THE INVENTION

It is, therefore, an object of the present invention to provide an improved support for a thread cutting tool for a lathe with which the thread cutting operation can be interrupted and started again at any desired length of the thread without the use of stop bosses or end switches.

According to the present invention, and in order to meet the above object, the supporting arrangement includes, concentrically arranged within each other, an axle releasably mounted on a fixed portion of the lathe which lies opposite to the chuck, a connecting piece carrying the thread cutting tool and rotatable with respect to the axle and, a gripping sleeve rotatable mounted with respect to the axle and the connecting piece, the axle, the connecting piece and the gripping sleeve being mechanically coupled with respect to each other.

BRIEF DESCRIPTION OF THE DRAWING

The invention will become more readily apparent from the following description of a preferred embodiment thereof shown, by way of example, in the accompanying drawing, in which.

DESCRIPTION OF THE PREFERRED EMBODIMENT

Figure 1:
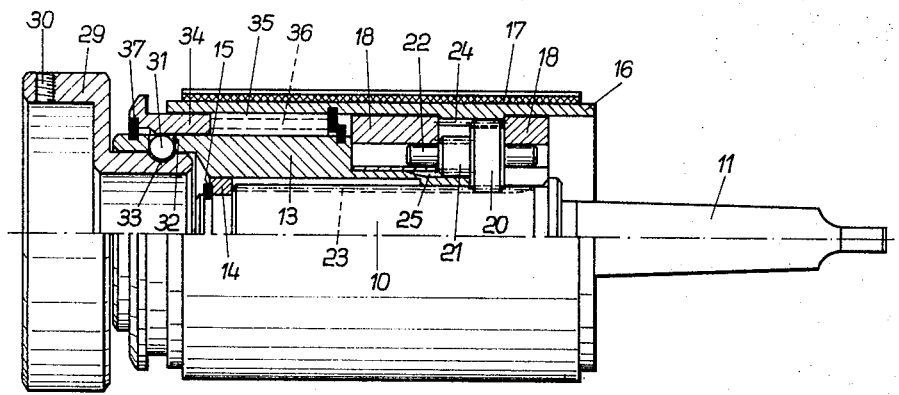
FIG. 1 illustrates the supporting apparatus according to the present invention, partially in section.

With reference to FIG. 1, it is seem that the cutting tool supporting apparatus according to the present invention includes a stationary axle 10 which has a Morse-cone 11 in order that the axle 10 could be removably supported in the head stock 12 of a lathe, Concentrically with respect to the axle 10 and, rotatably with respect thereto, a connecting piece 13 is arranged which is supported on a ring 14 at the front end of the axle 10. The ring 14 is fixed in its axial position by means of a snap ring 15. The connecting piece 13 is concentrically surrounded by a grip sleeve 16 which is rotatably mounted with respect to the axle 10. The gripping sleeve 16 on its outer surface is provided with a layer 17 made from a synthetic material or similar material which can be easily gripped.

Radially between the gripping sleeve 16 and between the intermediate or connecting piece 13 there is provided a carrying member 18 which is supported also by the axle 10 and by the connecting piece 13. The carrying member 18 serves for the journaling of cog wheel pairs 20, 21, of which one can be identified in FIG. 1 and which are mounted on a common axle 22 and are fixed against rotation with respect to axle 22. The toothed wheel or cog wheel 20 having the larger diameter will mash with the teeth 23 of the axle 10 on one hand and, on the other hand, it will engage also the inner teeth 24 provided in the gripping sleeve 16. The teeth 23 on axle 10 extend in a region defining the full axial movement of the tool support during a threading process. The smaller toothed wheel 21 is in engagement by means of a teething 25 on the connecting piece 13. By means of the toothed wheels 20, 21 in engagement with the teethings 23, 24 and 25, there will be a mechanical coupling established between the axle 10, the connecting piece 13 and the gripping sleeve 16 so that rotation can be had and, at the same time, due to the translating effect of the above gears, the gripping or retaining force required for the gripping surface is substantially reduced. At the same time, the gears 20, 25 provide simultaneously for the axial shifting of members 13, 16 with respect to the axle 10, so that during the threading process the tail stock 12 can be remained clamped on its support on the lathe.

Figure 2:
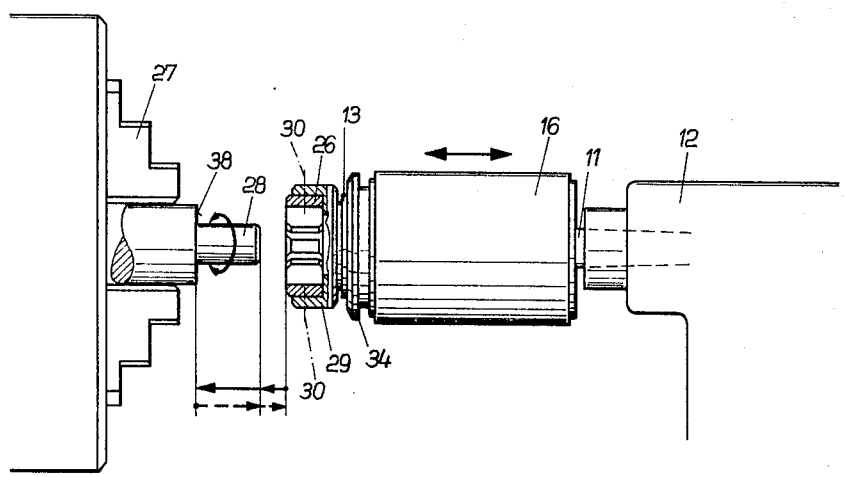
FIG. 2 illustrates the supporting apparatus according to the present invention as mounted on a lathe in operational condition.

The thread cutting apparatus itself which has a conventionally available construction, can be an inner tapping device or, as illustrated in FIG. 2, it is an outer thread cutting tool 26 used for the threading of a workpiece 28 held in the chuck 27, and is fixed in place by means of bolts 30 in the cutting tool support 29. The necessary translation of the rotational momentum between the connecting piece 13 and the cutting tool receiver or support 29 is performed by spheres 31 which are placed in radial recesses 32 provided in the connecting piece 13 and engage with spherical indentations 33 provided in the cutting tool receiver or support 29. The spheres 31 are retained in their engaged position by means of a sleeve member 34 which is mounted in a ring slot 35 between members 13 and 16 and is axially slideable between the gripping sleeve 16 and the connecting piece 13 against the bias provided by means of a spring 36 tending to force it against a boss 37 on the connecting piece 13. The above-described construction and arrangement of the cutting tools 29 permits a quick exchange of the support 29 and the cutting tool placed into it.

In the following the operation of the supporting arrangement is described with special reference to FIG. 2:

First the gripping sleeve 16 with the connecting piece 13 and the cutting tool in it is moved by hand onto the workpiece 28 and the threading starts. During the threading process the gripping sleeve 16 is held about its circumference by hand. The gripping sleeve 16 during the cutting process will advance itself axially with respect to axle 10 due to the threading. Then the collar 38 on the work-piece 28 is reached whereupon the required retaining or gripping force on sleeve 16 increases. The gripping sleeve 16 is then quickly released so that the cutting tool is rotated with the same speed as the work-piece 28. With this the cutting process has been completed.

As soon as the gripping sleeve 16 is let free at any instant of the cutting operation, then the cutting tool will cease the cutting operation and will rotate with the same speed as the work-piece 28.

If the rotation of the direction of the lathe is changed, then the gripping sleeve 16 becomes gripped again and the tool will run back backward. The gripping sleeve 16 will be advanced on the axle 10 by itself in the opposite direction. As soon as the tool runs off the work-piece, the cutting process is completed.

As it has been shown with the supporting arrangement according to the present invention the following advantages are attained:

The tool support device which is adapted to cut inner or outer threads operates without the employment of bosses, end switches, came, lathe dogs and couplings. It can be started by simply gripping the grip sleeve 16 by hand. By reducing or increasing the gripping force the tapping process can be discontinued, or restarted, at any position without damaging the thread which has already been cut and, the threading can be completely discontinued or continued at a later time. The run-up of the cutting tool during the tapping process on resistances, such as collars, or blind holes is immediately noticed and the cutting process can be interrupted by simply releasing the gripping sleeve 16 at any position of the tapping process. If the cutting tool runs up on the work-piece 28 or against the chuck 27, or if the tapping process is disturbed for some reason, then the rotational momentum exceeds the stripping force, so that thereby the tapping process is automatically discontinued; the work-piece and the cutting tool run then at a similar speed so that a break of the cutting tools or a damage of the cut thread is prevented. The tool supporting arrangement according to the present invention can be used for cutting left or right threads.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. An apparatus for supporting a thread cutting tool on a lathe and for connecting to a tail stock of said lathe opposite chuck means of said lathe adapted to receive a work piece and to rotate it about an axis of rotation, comprising, in combination:

connecting means removably coupling said apparatus to said tail stock including elongated exle means;

holding means adapted for holding said cutting tool opposite the position of said work piece supported by and disposed rotatably concentrically with said axle means, and operable to be displaced longitudinally to said axle means;

gripping means rotatable about said axle means and operable to be displaced longitudinally with respect to said axle means; and planetary gear means putting in driving connection said axle means, said holding means, and said gripping means whereby rotational forces applied to said holding means are transmitted to said gripping means at a reduced level and the absence of a restraining force on said gripping means permits said holding means to rotate in response to rotational forces applied thereto.

2. The apparatus as claimed in claim 1, wherein said holding means comprises cutting tool supporting means and rotational translating means are provided for translating the rotational forces between said holding means and said cutting tool supporting means, said rotational translating means comprising sphere means disposed in radial recesses defined in said holding means and adapted to engage mating indentations provided in said cutting tool support whereby said sphere means can translate the rotation of said cutting tool supporting means to said holding means.

3. The apparatus as claimed in claim 1, wherein said planetary gear means comprises a pair of gear means having different diameters, a common shaft means for mounting said gear means, a journaling means for journaling said gear means, said axle means comprising an outer teething, said gripping means comprising an inner toothing and said holding means comprising an outer toothing, said gear means having the larger diameter engaging the outer teething of said axle means and said inner teething of said gripping means, said gear means having the smaller diameter engaging said outer teething of said holding means.

4. The apparatus as claimed in claim 3, wherein said teething on said axle means extends in a region axially on said axle means, said region defining the axial region of sliding of said holding means and said gripping means.

5. The apparatus as claimed in claim 1, wherein said axle means comprises a conical end portion for securing said axle means in said tail stock.

6. The apparatus as claimed in claim 1, wherein the outer surface of said gripping means comprises an outer layer made from a material adapted for improved manual gripping of said gripping means.

7. The apparatus as claimed in claim 6, wherein the outer surface of said gripping means has a knurling thereon.

8. The apparatus as claimed in claim 2, wherein a spring means is provided abutting against a boss means provided on said connecting means for forcing said sphere means into said indentations and thereby establishing coupling between said holding means and said cutting tool support means.

9. The apparatus as claimed in claim 8, wherein said gripping means is slideably arranged in a ring slot formed between said holding means and said gripping means, said spring means resiliently enabling said gripping means to slide axially.

* * * * *